United States Patent Office 2,848,392
Patented Aug. 19, 1958

2,848,392
ELECTRODEPOSITION OF NICKEL AND ELECTROLYTES THEREFOR

Harry E. Ford, Euclid, and Wilbur J. Shenk, Jr., Shaker Heights, Ohio, assignors to The Harshaw Chemical Company, Cleveland, Ohio, a corporation of Ohio No Drawing. Application October 10, 1956 Serial No. 615,012

7 Claims. (Cl. 204—49)

This invention relates to electrodeposition of nickel and electrolytes to be used in connection therewith and more specifically to additives for electrodeposition of nickel, electrodeposition processes employing such additives and electrolytes useful for such processes.

This invention is in the nature of an improvement over the inventions disclosed and claimed in U. S. patents of Wilbur J. Shenk, Jr., No. 2,757,133, issued July 31, 1956, and No. 2,766,284 issued October 9, 1956.

In accordance with the present invention, we utilize in the nickel plating process additives of the following general formula:

$C_6H_5SO_2NHSO_2C_6H_4O[CH_2CH_2O]_nC_6H_4SO_2NHSO_2C_6H_5$ wherein $n$ is an integer from 1 to 2. Our invention contemplates also the salts of the compounds of the above general formula and derivatives wherein from 1 to 4 nuclear hydrogens are replaced by radicals of the class consisting of chlorine, bromine, fluorine, methyl, ethyl, carboxyl and sulfamyl.

So far as we are aware, these compounds are new compounds never before synthesized or used for any purpose and while we are chiefly interested in their usage as additives in nickel electrodeposition, they are undoubtedly useful for other purposes.

These compounds may be synthesized by reacting together aryl sulfonamides with compounds of the general formula $ClSO_2C_6H_4O[CH_2CH_2O]_nC_6H_4SO_2Cl$ wherein $n$ is an integer from 1 to 2.

A specific example of a compound according to the invention is as follows:

$C_6H_5SO_2NHSO_2C_6H_4OCH_2CH_2OC_6H_4SO_2NHSO_2C_6H_5$

This compound was synthesized as follows:

A quantity of 0.05 mol (20.5 grams) of 1,2-diphenoxy-ethane-p,p'-disulfonyl chloride was added to 0.2 mol (31.4 grams) of benzene sulfonamide dissolved in 0.2 mol (8.34 grams, 96% strength) of NaOH in 150 cc. of water. The sulfonyl chloride was added to the sulfonamide solution over a period of one-half hour at from 50 to 55° C. The reaction mixture was stirred for one-half hour at this temperature and then heated to reflux for 1 hour.

The mixture was allowed to stand overnight and diluted to 600 cc. The pH was adjusted to 2.5 with dilute hydrochloric acid. The excess benzene sulfonamide was filtered off at 20° C. It amounted to 3 grams. The filtrate, a clear straw-colored solution was acidified with hydrochloric acid by the addition of enough to make the solution 5% HCl, this addition being made at 50–60° C.

A fine white crystalline precipitate was formed. This was filtered off at 35° C. and dried. The yield was 25 grams which is a 76.8% yield. The melting point of the product was 229–234° C. In order to further purify the product it was dissolved in one liter of water and brought to a boil. The pH was adjusted to 7.0 with sodium carbonate whereupon all the material went into solution. The solution was carbon treated with activated carbon and filtered. The filtrate was acidified with sufficient acid to make the solution 5% HCl, this addition being made at 50–60° C. dropwise. A fine white crystalline precipitate was formed and separated by filtration at 35° C. This precipitate was dried at 40–50° C. and yielded 17 grams of product, a yield of 52.2% of theoretical. The melting point was 233–238° C., the formula being

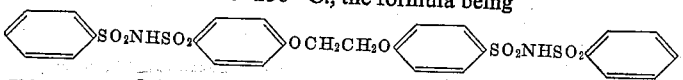

Other examples of compounds according to the invention may be produced in the same way, for example, the compounds appearing in Table I.

TABLE I (1) $[C_6H_5SO_2NHSO_2C_6H_4OCH_2]_2$
(2) $[ClCH_4SO_2NHSO_2C_6H_4OCH_2]_2$
(3) $[ClC_6H_4SO_2NHSO_2C_6H_4OCH_2CH_2]_2O$
(4) $[BrC_6H_4SO_2NHSO_2C_6H_4OCH_2]_2$
(5) $[CH_3C_6H_4SO_2NHSO_2C_6H_4OCH_2]_2$
(6) $[C_2H_5C_6H_4SO_2NHSO_2C_6H_4OCH_2]_2$
(7) $[HOOCC_6H_4SO_2NHSO_2C_6H_4OCH_2]_2$
(8) $[NH_2SO_2OC_6H_4SO_2NHSO_2C_6H_4OCH_2]_2$

The foregoing are but a few examples of the numerous similar compounds within scope of the above stated general formula and which may be made in the same way as the example shown above by selection of suitable starting materials, all of which will be obvious from the foregoing to persons skilled in the art. Preferred compounds are of the formula

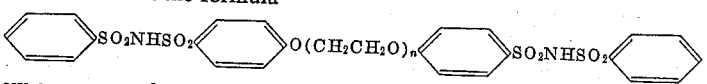

where $n$ is an integer from 1 to 2 or salts thereof or derivatives of said compounds or said salts wherein from 1 to 4 nuclear hydrogens are replaced by radicals of the class consisting of chlorine, bromine, fluorine, methyl, ethyl, carboxyl and sulfamyl. Compounds so prepared within the above indicated class of compounds are suitable as additives for use in electrodeposition of nickel of improved lustre when used either as the sole brightening additive or with auxiliary brightening additives capable of enhancing the brilliance of the deposit. When such compounds are used as the sole brightening additives, the solutions under all normal circumstances are capable of producing deposits of improved lustre and in some instances are capable of producing better than semibright deposits and even deposits of image reflecting brightness under favorable conditions. Still brighter deposits can be produced by the addition of auxiliary brighteners.

The preferred basic solutions in connection with which the invention is realized are as follows:

*All sulfate*

$NiSO_4.7H_2O$ ------ 100 to 400 g., preferably 200 to 300 g.
Boric acid -------- 0 to 60 g., preferably 10 to 40 g.
Wetting agent (e. g., sodium lauryl sulfate) ---------- 0 to 0.5 g., preferably 0.05 to 0.2 g.
$H_2O$ to make ----- 1000 cc.

*All chloride*

$NiCl_2.6H_2O$ ------ 50 to 250 g., preferably 100 to 200 g.
Boric acid -------- 0 to 60 g., preferably 10 to 40 g.

Wetting agent (e. g.,
sodium lauryl sul-
fate)_____ 0 to 0.5 g., preferably 0.05 to 0.2 g.
$H_2O$ to make_____ 1000 cc.

*Sulfate-chloride (Watts type)*

$NiSO_4.7H_2O$_____ 100 to 400 g., preferably 200 to 300 g.
$NiCl_2.6H_2O$_____ 10 to 60 g., preferably 25 to 50 g.
Boric acid_____ 0 to 50 g., preferably 15 to 50 g.
Wetting agent (e. g.,
sodium lauryl sul-
fate)_____ 0 to 0.5 g., preferably 0.025 to 0.2 g.
$H_2O$ to make_____ 1000 cc.

To a bath of the above character there may be added from 0.2 to 6 grams per liter of a compound within the above indicated general formula suitably such as one of those appearing in Table I or a mixture thereof or one of their salts such as the nickel, iron, sodium, potassium, or cobalt salt thereof or one of their above mentioned derivatives. It is to be understood that these various salts are equivalent to the compounds themselves inasmuch as the anion is the effective agent and is the same irrespective of which salt is chosen.

The above described solutions can be operated by electrolysis between a cathode to be coated and a nickel anode at a pH preferably from 3.0 to 5.0 (suitably 3.5 to 4.5), at a temperature from 100° F. to 160° F. and at an average cathode current density from 30 to 60, suitably 40 to 50 amperes per square foot.

As above indicated, the novel class of compounds can be effectively used in combination with a wide variety of other brighteners, with the result that there is produced bright, ductile deposits having good throwing power and capable of being operated trouble-free for long periods of time. Examples of such cooperating brighteners are as follows:

TABLE II (1) Ethylene cyanohydrin
(2) Vinyl pyridine
(3) Triaminotriphenylmethane
(4) N-Methylquinaldinium methyl sulfate
(5) Allyl alcohol
(6) Succinonitrile
(7) Cyclohexanone oxime
(8) Butyraldoxime
(9) Benzaldehyde
(10) N-Methylisoquinolinium methyl sulfate
(11) N-Methylpyridinium methyl sulfate
(12) Pyruvic aldehyde
(13) Barbituric acid The following specific examples of plating bath compositions and conditions suitable for production of nickel deposits of improved lustre will serve to illustrate the many possible solutions and plating processes within the contemplation of the invention:

EXAMPLE I

| | |
|---|---|
| $NiSO_4.6H_2O$ | grams__ 240 |
| $NiCl_2.6H_2O$ | do____ 40 |
| $H_3BO_3$ | do____ 40 |
| $[C_6H_5SO_2NHSO_2C_6H_4OCH_2]_2$ | do____ 2 |
| pH | 3.5 |
| Temperature | ° F 140 |
| Cathode current density | A.S.F.__ 40 |
| $H_2O$ to make one liter. | |

EXAMPLE II

| | |
|---|---|
| $NiSO_4.6H_2O$ | grams__ 240 |
| $NiCl_2.6H_2O$ | do____ 40 |
| $H_3BO_3$ | do____ 40 |
| $[ClC_6H_4SO_2NHSO_2C_6H_4OCH_2CH_2]_2O$ | do____ 6 |
| pH | 3.5 |
| Temperature | ° F 140 |
| Cathode current density | A.S.F.__ 40 |
| $H_2O$ to make one liter. | |

EXAMPLE III

| | |
|---|---|
| $NiCl_2.6H_2O$ | grams__ 300 |
| $H_3BO_3$ | do____ 50 |
| $[C_6H_5SO_2NHSO_2C_6H_4OCH_2]_2$ | do____ 2 |
| pH | 3.5 |
| Temperature | ° F 140 |
| Cathode current density | A.S.F.__ 40 |
| $H_2O$ to make one liter. | |

EXAMPLE IV

| | |
|---|---|
| $NiSO_4.6H_2O$ | grams__ 240 |
| $NiCl_2.6H_2O$ | do____ 40 |
| $H_3BO_3$ | do____ 40 |
| $[C_6H_5SO_2NHSO_2C_6H_4OCH_2]_2$ | do____ 0.5 |
| Ethylene cyanohydrin | do____ 0.24 |
| pH | 3.5 |
| Temperature | ° F 140 |
| Cathode current density | A.S.F.__ 40 |
| $H_2O$ to make one liter. | |

EXAMPLE V

| | |
|---|---|
| $NiSO_4.6H_2O$ | grams__ 240 |
| $NiCl_2.6H_2O$ | do____ 40 |
| $H_3BO_3$ | do____ 40 |
| $[ClC_6H_4SO_2NHSO_2C_6H_4OCH_2CH_2]_2O$ | do____ 0.5 |
| Triaminotriphenyl methane | do____ 0.005 |
| pH | 3.2 |
| Temperature | ° F__ 140 |
| Cathode current density | A.S.F.__ 40 |
| $H_2O$ to make one liter. | |

EXAMPLE VI

| | |
|---|---|
| $NiSO_4.6H_2O$ | grams__ 240 |
| $NiCl_2.6H_2O$ | do____ 40 |
| $H_3BO_3$ | do____ 40 |
| $[CH_3C_6H_4SO_2NHSO_2C_6H_4OCH_2]_2$ | do____ 2 |
| pH | 3.5 |
| Temperature | ° F 140 |
| Cathode current density | A.S.F.__ 40 |
| $H_2O$ to make one liter. | |

Having thus described the invention, what is claimed is:

1. An acid, nickel electroplating solution comprising a nickel electrolyte of the class consisting of nickel sulfate, nickel chloride and mixtures thereof, together with an addition agent chosen from the class consisting of compounds of the general formula:

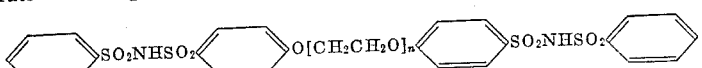

wherein *n* is an integer from 1 to 2 inclusive, and the sodium, potassium, iron, cobalt and nickel salts thereof and derivatives of the foregoing wherein from 1 to 4 nuclear hydrogen atoms are replaced by radicals of the class consisting of chlorine, bromine, fluorine, methyl, ethyl, carboxyl and sulfamyl, said addition agent being present to the extent of from 0.2 to 6 grams per liter of solution.

2. An acid, nickel electroplating solution comprising a nickel electrolyte of the class consisting of nickel sulfate, nickel chloride and mixtures thereof, together with an addition agent chosen from the class consisting of compounds having the formula

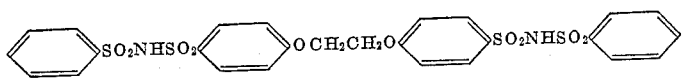

and the sodium, potassium, iron, cobalt and nickel salts thereof and derivatives of the foregoing wherein from 1 to 4 nuclear hydrogen atoms are replaced by radicals of the class consisting of chlorine, bromine, fluorine, methyl, ethyl, carboxyl and sulfamyl, said addition agent being present to the extent of from 0.2 to 6 grams per liter of solution.

3. An aqueous, acid nickel electroplating solution comprising nickel sulfate equivalent to from 100 to 400 grams per liter of nickel sulfate heptahydrate, nickel chloride equivalent to from 10 to 60 grams per liter of nickel chloride hexahydrate, up to 50 grams per liter of boric acid and from 0.2 to 6 grams per liter of a compound chosen from the class consisting of compounds of the general formula $C_6H_5SO_2NHSO_2C_6H_4O[CH_2CH_2O]_nC_6H_4SO_2NHSO_2C_6H_5$ wherein $n$ is an integer from 1 to 2 inclusive, and the sodium, potassium, iron, cobalt and nickel salts thereof and derivatives of the foregoing wherein from 1 to 4 nuclear hydrogen atoms are replaced by radicals of the class consisting of chlorine, bromine, fluorine, methyl, ethyl, carboxyl and sulfamyl.

4. An aqueous, acid nickel electroplating solution comprising nickel sulfate equivalent to from 200 to 300 grams per liter of nickel sulfate heptahydrate, nickel chloride equivalent to from 25 to 50 grams per liter of nickel chloride hexahydrate, from 15 to 50 grams per liter of boric acid and from 0.2 to 6 grams per liter of a compound selected from the class consisting of compounds having the general formula:

$C_6H_5SO_2NHSO_2C_6H_4O[CH_2CH_2O]_nC_6H_4SO_2NHSO_2C_6H_5$ wherein $n$ is an integer from 1 to 2 inclusive, and the sodium, potassium, iron, cobalt and nickel salts thereof and derivatives of the foregoing wherein from 1 to 4 nuclear hydrogen atoms are replaced by radicals of the class consisting of chlorine, bromine, fluorine, methyl, ethyl, carboxyl and sulfamyl.

5. An aqueous, acid nickel electroplating solution comprising nickel sulfate equivalent to from 200 to 300 grams per liter of nickel sulfate heptahydrate, nickel chloride equivalent to from 25 to 50 grams per liter of nickel chloride hexahydrate, from 15 to 50 grams per liter of boric acid and from 0.2 to 6 grams per liter of a compound chosen from the class consisting of compounds having the formula:

$C_6H_5SO_2NHSO_2C_6H_4OCH_2CH_2OC_6H_4SO_2NHSO_2C_6H_5$ and the sodium, potassium, iron, cobalt and nickel salts thereof and derivatives of the foregoing wherein from 1 to 4 nuclear hydrogen atoms are replaced by radicals of the class consisting of chlorine, bromine, fluorine, methyl, ethyl, carboxyl, and sulfamyl.

6. A process for the electrodeposition of nickel comprising electrolyzing between a cathode to be coated with nickel and a nickel anode, at a pH from 3.0 to 5.0, and average cathode current density from 30 to 60 amperes per square foot, the solution defined in claim 1.

7. A process for the electrodeposition of nickel comprising electrolyzing between a cathode to be coated with nickel and a nickel anode, at a pH from 3.0 to 5.0, and average cathode current density from 30 to 60 amperes per square foot, the solution defined in claim 5.

References Cited in the file of this patent

UNITED STATES PATENTS

| | | |
|---|---|---|
| 2,757,133 | Shenk | July 31, 1956 |
| 2,766,284 | Shenk | Oct. 9, 1956 |